United States Patent
Simpson (10) Patent No.: US 11,396,900 B2
(45) Date of Patent: Jul. 26, 2022

(54) FASTENER AND METHODS OF MANUFACTURING AND USE

(71) Applicant: The Boeing Company, Chicago, IL (US)

(72) Inventor: Blake A. Simpson, Chicago, IL (US)

(73) Assignee: The Boeing Company, Chicago, IL (US)

(*) Notice: Subject to any disclaimer, the term of this patent is extended or adjusted under 35 U.S.C. 154(b) by 13 days.

(21) Appl. No.: 16/409,298

(22) Filed: May 10, 2019

(65) Prior Publication Data
US 2020/0355212 A1    Nov. 12, 2020

(51) Int. Cl.
| | |
|---|---|
| *B62D 65/02* | (2006.01) |
| *B21D 53/88* | (2006.01) |
| *B62D 21/02* | (2006.01) |
| *F16B 33/02* | (2006.01) |
| *B33Y 80/00* | (2015.01) |
| *F16B 33/00* | (2006.01) |
| *B33Y 10/00* | (2015.01) |
| *B33Y 70/00* | (2020.01) |

(52) U.S. Cl.
CPC .............. *F16B 33/02* (2013.01); *B33Y 80/00* (2014.12); *F16B 33/004* (2013.01); *B33Y 10/00* (2014.12); *B33Y 70/00* (2014.12)

(58) Field of Classification Search
CPC .... F16B 33/02; F16B 33/004; F16B 19/1054; F16B 19/008; F16B 19/02; F16B 39/282; F16B 43/001; B33Y 80/00; B33Y 10/00; B33Y 70/00; B64D 45/02
See application file for complete search history.

(56) References Cited

U.S. PATENT DOCUMENTS

| | | | | |
|---|---|---|---|---|
| 388,000 | A * | 8/1888 | Rider ...................... | F16B 35/06 411/399 |
| 586,232 | A * | 7/1897 | English ................... | F16B 35/06 411/399 |
| 933,865 | A * | 9/1909 | Umholtz ................. | F16B 35/06 411/403 |
| 1,151,861 | A * | 8/1915 | Brumback .............. | F16B 35/06 411/399 |

(Continued)

OTHER PUBLICATIONS

Extended European Search Report prepared by the European Patent Office in application No. EP 20 16 2102.6 dated Oct. 1, 2020.

*Primary Examiner* — Jacob J Cigna
*Assistant Examiner* — Michael W Hotchkiss
(74) *Attorney, Agent, or Firm* — McDonnell Boehnen Hulbert & Berghoff LLP (57) ABSTRACT

The present disclosure provides a fastener. The fastener includes an elongated body having a first end and a second end opposite the first end. The fastener also includes a head having a first surface and a second surface opposite the first surface. The first end of the elongated body is coupled to the second surface of the head, and a diameter of the head is greater than a diameter of the elongated body. The fastener also includes a sleeve positioned over at least a portion of the elongated body and the second surface of the head. The fastener also includes a plurality of textured elements positioned on an exterior surface of the sleeve adjacent the second surface of the head. One or more of the plurality of textured elements extend from the exterior surface of the sleeve to the first surface of the head.

20 Claims, 6 Drawing Sheets

(56) References Cited

U.S. PATENT DOCUMENTS

| | | | | |
|---|---|---|---|---|
| 1,238,636 | A * | 8/1917 | Christofferson | F16B 35/06 411/399 |
| 2,120,577 | A * | 6/1938 | Schulte | F16B 13/0858 411/71 |
| 2,237,236 | A * | 4/1941 | Matthews | F16B 35/06 411/396 |
| 2,518,468 | A * | 8/1950 | Harding | F16B 39/36 411/269 |
| 3,239,036 | A * | 3/1966 | William | F16B 33/004 403/408.1 |
| 4,007,659 | A * | 2/1977 | Stencel | F16B 19/1054 411/34 |
| 4,364,697 | A * | 12/1982 | Binns | F16B 19/1063 411/38 |
| 4,755,904 | A * | 7/1988 | Brick | B64D 45/02 244/1 A |
| 6,190,102 | B1 * | 2/2001 | Vignotto | B60B 3/165 301/105.1 |
| 7,293,947 | B2 * | 11/2007 | Craven | F16B 35/048 411/387.2 |
| 8,322,958 | B2 * | 12/2012 | Haylock | F16B 39/01 411/69 |
| 8,434,984 | B2 * | 5/2013 | Toosky | F16B 19/10 411/361 |
| 8,777,533 | B2 * | 7/2014 | Hufnagl | F16B 19/1036 411/55 |
| 9,638,236 | B2 * | 5/2017 | Kamal | B64D 45/02 |
| 9,669,942 | B2 * | 6/2017 | Khosravani | F16B 35/041 |
| 9,702,396 | B2 * | 7/2017 | Liebscher | F16B 33/06 |
| 9,759,246 | B2 * | 9/2017 | Haylock | B64D 45/02 |
| 9,908,637 | B2 * | 3/2018 | Whitlock | B64D 45/02 |
| 9,912,137 | B2 * | 3/2018 | Le | B29C 70/882 |
| 9,939,004 | B2 * | 4/2018 | Kamal | F16B 33/008 |
| 10,006,478 | B2 * | 6/2018 | Hufnagl | F16B 5/04 |
| 10,186,788 | B2 * | 1/2019 | Heeter | F16B 33/006 |
| 10,273,830 | B2 * | 4/2019 | Holland | F16B 5/0088 |
| 10,451,099 | B2 * | 10/2019 | Haylock | B64D 45/02 |
| 10,457,414 | B2 * | 10/2019 | Liebscher | F16B 43/001 |
| 10,544,815 | B2 * | 1/2020 | Bourges | C10M 125/26 |
| 10,851,825 | B2 * | 12/2020 | Regnard | F16B 25/0021 |
| 2005/0097849 | A1 * | 5/2005 | Hayes | F16B 13/141 52/698 |
| 2007/0237606 | A1 * | 10/2007 | Takasaki | F16B 25/0047 411/387.2 |
| 2008/0075555 | A1 * | 3/2008 | March | F16B 35/048 411/361 |
| 2009/0053006 | A1 * | 2/2009 | Hufnagl | F16B 19/1054 81/436 |
| 2010/0124472 | A1 * | 5/2010 | Nguyen | H01R 43/26 411/337 |
| 2010/0196120 | A1 * | 8/2010 | Davies | F16B 35/06 411/378 |
| 2010/0219287 | A1 * | 9/2010 | S nchez-Brunete Lvarez | B64D 45/02 244/1 A |
| 2010/0272537 | A1 * | 10/2010 | Haylock | F16B 39/01 411/80.1 |
| 2011/0142567 | A1 * | 6/2011 | Haylock | F16B 33/06 411/360 |
| 2011/0174536 | A1 * | 7/2011 | Wilson | B29C 70/443 174/84 S |
| 2011/0255205 | A1 * | 10/2011 | Lopez-Reina Torrijos | H01R 4/64 361/218 |
| 2013/0011217 | A1 * | 1/2013 | Avellon | F16B 2/005 72/356 |
| 2014/0130335 | A1 * | 5/2014 | Bickford | B25B 31/00 29/525.02 |
| 2015/0196951 | A1 * | 7/2015 | Bigot | B21J 15/26 29/243.526 |
| 2015/0337885 | A1 * | 11/2015 | Whitlock | F16B 35/048 411/411 |
| 2016/0053786 | A1 | 2/2016 | Haylock et al. | |
| 2016/0076581 | A1 * | 3/2016 | Liebscher | B64D 45/02 411/371.2 |
| 2017/0321736 | A1 * | 11/2017 | Seiler | F16B 13/00 |
| 2017/0343026 | A1 * | 11/2017 | Schaeffer | F16B 13/065 |
| 2018/0162551 | A1 | 6/2018 | Liebscher et al. | |
| 2018/0195549 | A1 * | 7/2018 | Kamal | F16B 33/008 |

\* cited by examiner

FASTENER AND METHODS OF MANUFACTURING AND USE

FIELD

The present disclosure relates generally to a fastener, and more particularly, to a fastener including a plurality of textured elements positioned on a head of the fastener.

BACKGROUND

Fasteners are used in many manufacturing applications, including aerospace manufacturing. When certain fasteners are installed in workpiece, a sealant may be initially applied to at least a portion of the fastener, and then the fastener is positioned in a hole in the workpiece. As the fastener is secured to the workpiece (e.g., during the forming of the bulb of a one-sided fastener), the sealant can create a hydraulic lock between the head of the fastener and the top of the hole. When this happens, the trapped sealant can expand into the hole and can create bulges in or otherwise damage the workpiece. In addition, as the fastener is secured to the workpiece, mechanics struggle to prevent the fastener from spinning, especially when there is sealant applied under a head of the fastener and along a shank of the fastener. In the situation of a one-sided fastener, for example, the fastener tends to spin and the frangible drive element does not break off at the intended torque.

SUMMARY

In one aspect, a fastener is described. The fastener includes (a) an elongated body having a first end and a second end opposite the first end, (b) a head having a first surface and a second surface opposite the first surface, wherein the first end of the elongated body is coupled to the second surface of the head, and wherein a diameter of the head is greater than a diameter of the elongated body, (c) a sleeve positioned over at least a portion of the elongated body and the second surface of the head, and a plurality of textured elements positioned on an exterior surface of the sleeve adjacent the second surface of the head, wherein one or more of the plurality of textured elements extend from the exterior surface of the sleeve to the first surface of the head.

In another aspect, a method of manufacturing a fastener is described. The method includes (a) forming an elongated body having a first end and a second end opposite the first end, (b) forming a head having a first surface and a second surface opposite the first surface, wherein the first end of the elongated body is coupled to the second surface of the head, and wherein a diameter of the head is greater than a diameter of the elongated body, (c) forming a sleeve positioned over at least a portion of the elongated body and the second surface of the head, and (d) forming a plurality of textured elements positioned on an exterior surface of the sleeve adjacent the second surface of the head, wherein one or more of the plurality of textured elements extend from the exterior surface of the sleeve to the first surface of the head.

In yet another aspect, a method for positioning a fastener in a workpiece is described. The method includes (a) positioning a sealant on at least a portion of the fastener, (b) inserting a second end of an elongated body of the fastener into a hole in the workpiece, wherein the fastener includes (i) a first end opposite the second end, (ii) a head having a first surface and a second surface opposite the first surface, wherein the first end of the elongated body is coupled to the second surface of the head, and (iii) a sleeve positioned over at least a portion of the elongated body and the second surface of the head, and (c) mating an exterior surface of the sleeve adjacent the second surface of the head to a surface in the hole, wherein the fastener includes a plurality of textured elements positioned on the exterior surface of the sleeve configured to create friction between the fastener and the surface in the hole to inhibit rotation of the fastener and to further allow the sealant to flow out from under the head of the fastener.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 1:
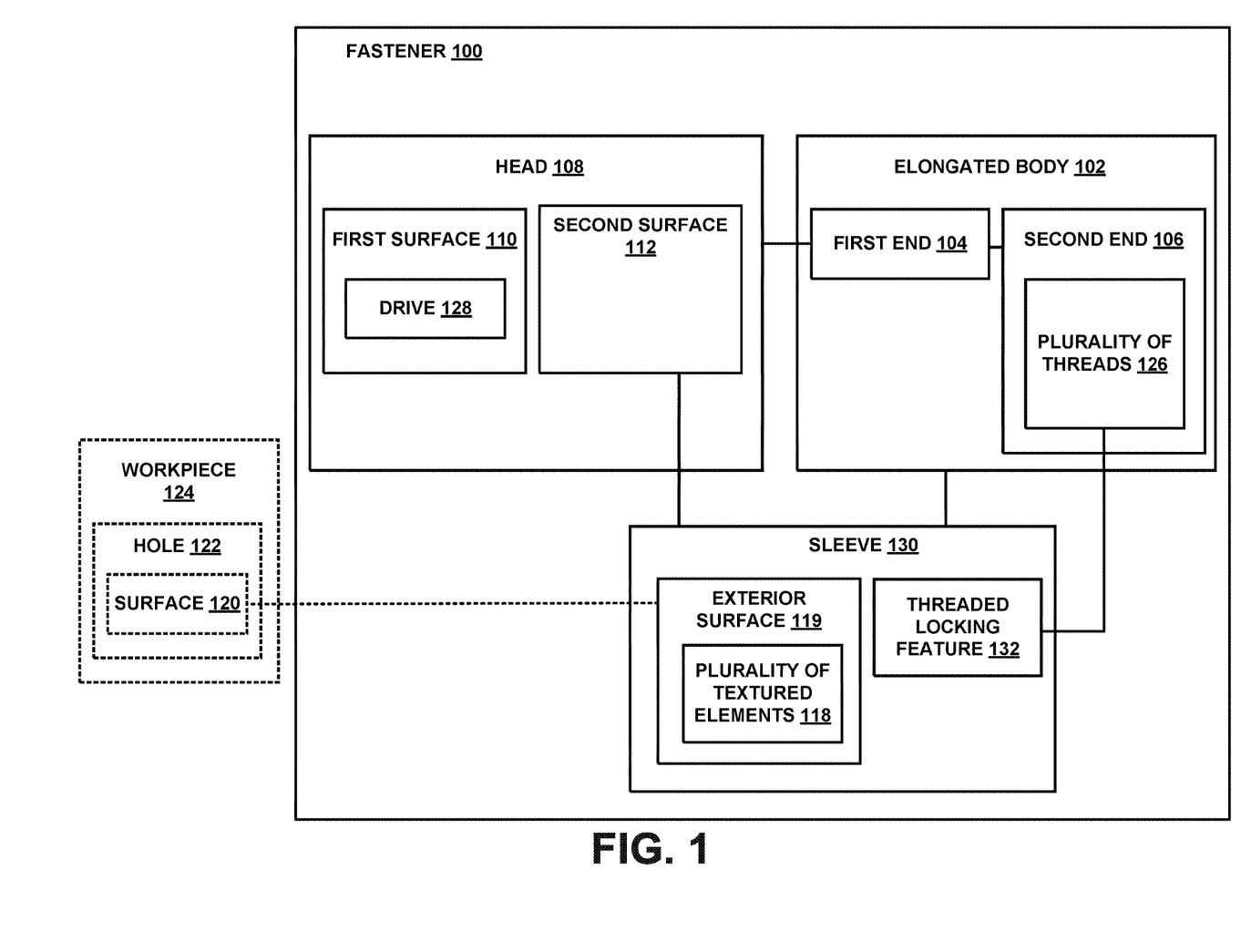
FIG. 1 is a block diagram of an example fastener, according to an example embodiment.

In FIG. 1, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 3:
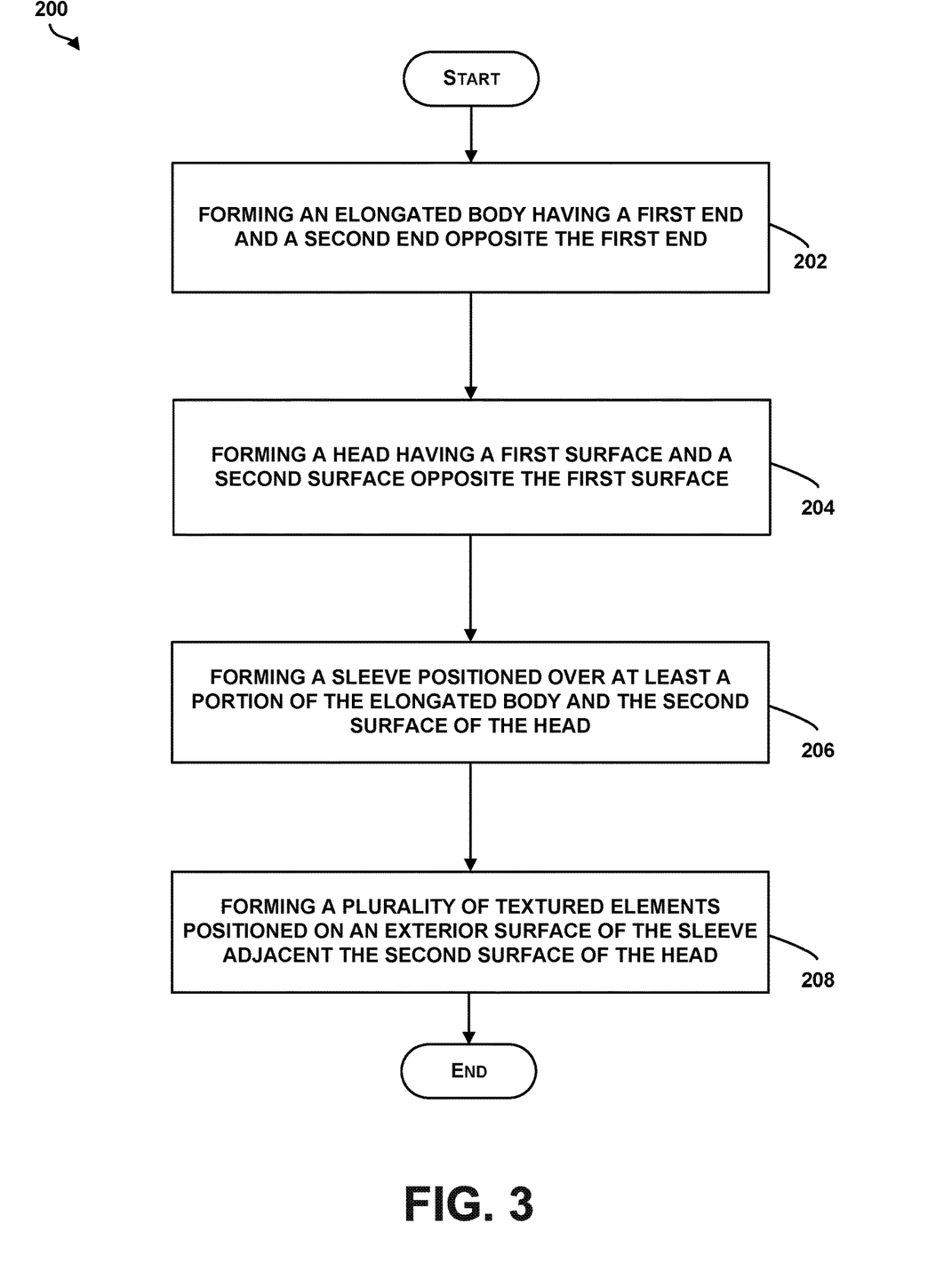
FIG. 3 is a flowchart of an example method, according to an example embodiment.
Figure 5:
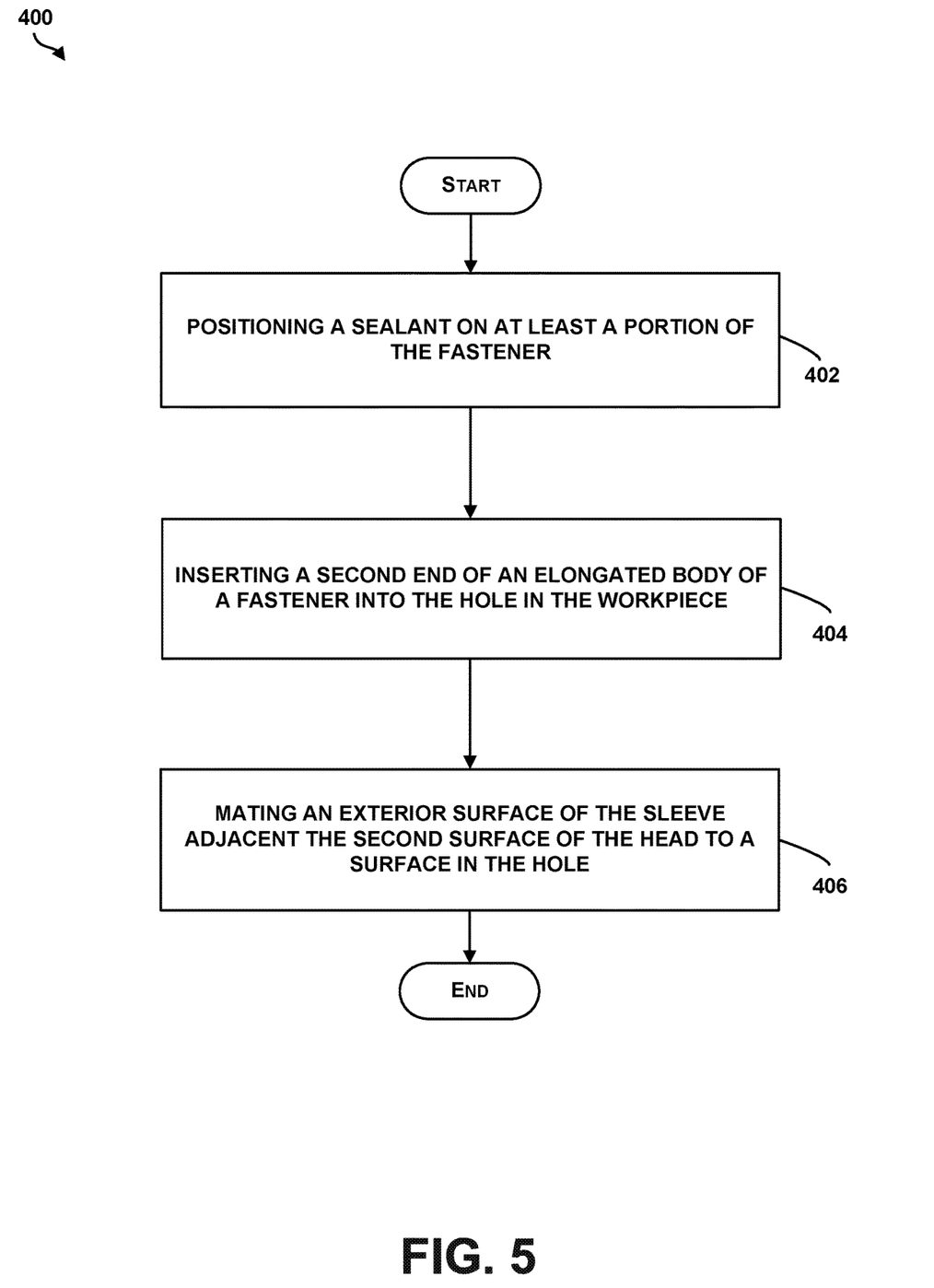
FIG. 5 is a flowchart of another example method, according to an example embodiment.

In FIGS. 3 and 5, the blocks may represent operations and/or portions thereof and lines connecting the various blocks do not imply any particular order or dependency of the operations or portions thereof. It will be understood that not all dependencies among the various disclosed operations are necessarily represented. FIGS. 3 and 5 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means+/−5%.

Illustrative, non-exhaustive examples, which may or may not be claimed, of the subject matter according the present disclosure are provided below.

Within examples, a fastener and methods of manufacturing and use are described herein. As discussed above, existing fasteners can experience hydraulic lock between the head of the fastener and the top of the hole into which the fastener is positioned as the fastener is secured to a workpiece. The trapped sealant can expand into the hole and can create bulges in or otherwise damage the workpiece. In addition, as traditional fasteners are secured to the workpiece, the elongated portion of the fastener can spin, which may prevent the frangible drive element of a one-sided fastener from breaking off at the intended torque. Existing solutions result in increased cost and/or decreased performance of the fastener.

The present disclosure provides an improved fastener that includes a plurality of textured elements providing a pattern of light texture applied on the surface adjacent the head of the fastener. The plurality of textured elements are thin and can be rolled or forged on a surface adjacent the head of the fastener that will come in contact with the workpiece once installed. The plurality of textured elements will give a sealant positioned in the hole of the workpiece many different pathways to flow during the torqueing of the fastener, and will also create more friction between the fastener and the surface of the workpiece.

Various other features of the example fastener discussed above, as well as methods for manufacturing and using these fasteners, are also described hereinafter with reference to the accompanying Figures.

With reference to the Figures, FIG. 1 illustrates a fastener 100 according to an example embodiment. As shown in FIG. 1, the fastener 100 includes an elongated body 102 having a first end 104 and a second end 106 opposite the first end 104. The fastener 100 also includes a head 108 having a first surface 110 and a second surface 112 opposite the first surface 110. The first end 104 of the elongated body 102 is coupled to the second surface 112 of the head 108. In one example, the elongated body 102 and the head 108 are formed integrally as a single unit. In another example, the elongated body 102 and the head 108 are formed separately and are coupled together during manufacturing. As shown in FIGS. 2A-2D, a diameter 114 of the head 108 is greater than a diameter 116 of the elongated body 102. The fastener 100 also includes a sleeve 130 positioned over at least a portion of the elongated body 102 and the second surface 112 of the head 108. The fastener 100 also includes a plurality of textured elements 118 positioned on an exterior surface 119 of the sleeve 130 adjacent the second surface 112 of the head 108. One or more of the plurality of textured elements 118 extend from the exterior surface 119 of the sleeve 130 to the first surface 110 of the head 108.

In another example, the plurality of textured elements 118 may be positioned directly on the second surface 112 of the head 108. In such an example, one or more of the plurality of textured elements 118 extend from the second surface 112 of the head 108 to the first surface 110 of the head 108.

Figure 2A:
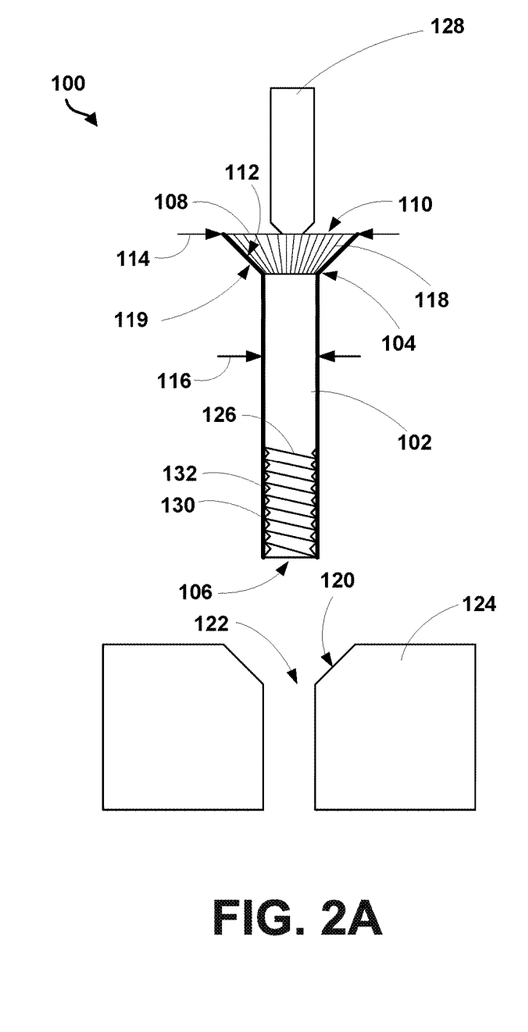
FIG. 2A is a side view of an example fastener, according to an example embodiment.
Figure 2B:
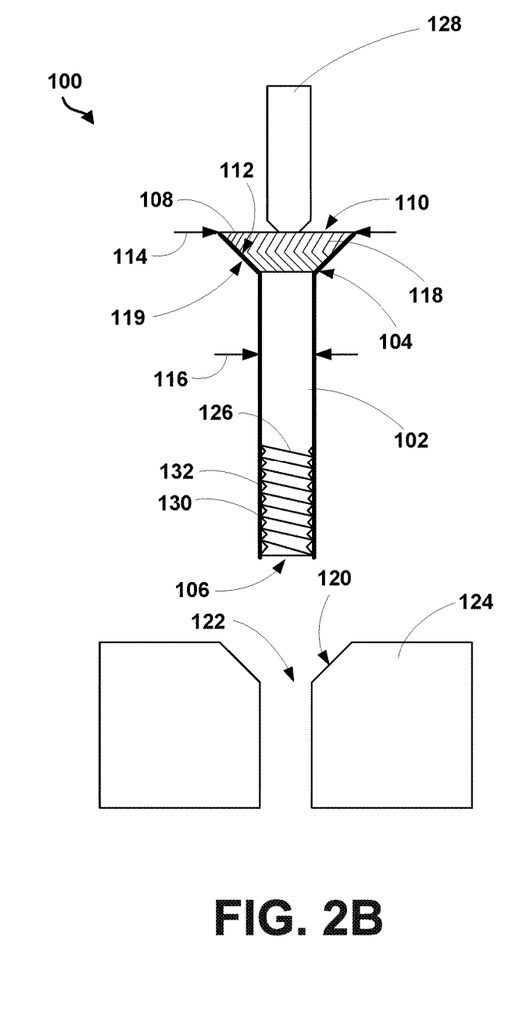
FIG. 2B is a side view of another example fastener, according to an example embodiment.
Figure 2C:
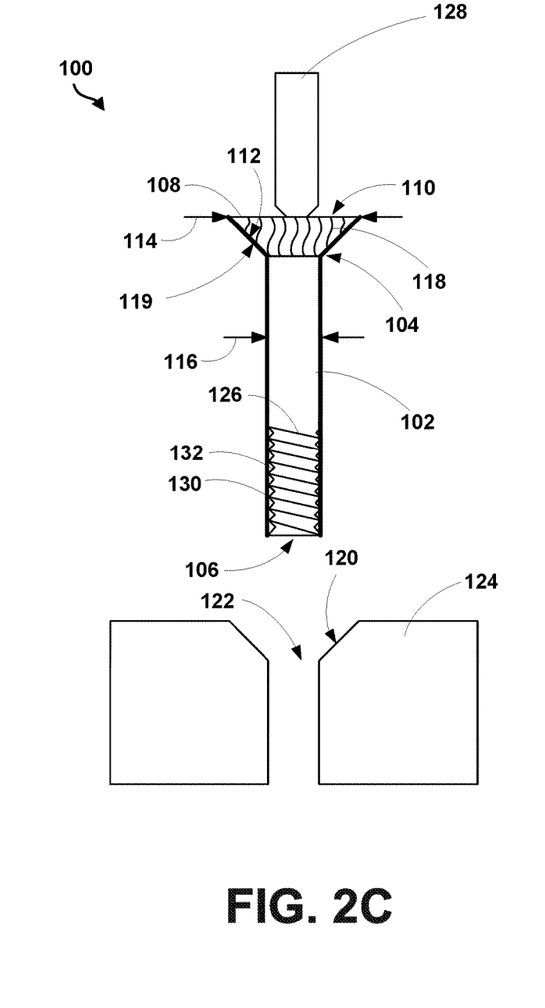
FIG. 2C is a side view of another example fastener, according to an example embodiment.
Figure 2D:
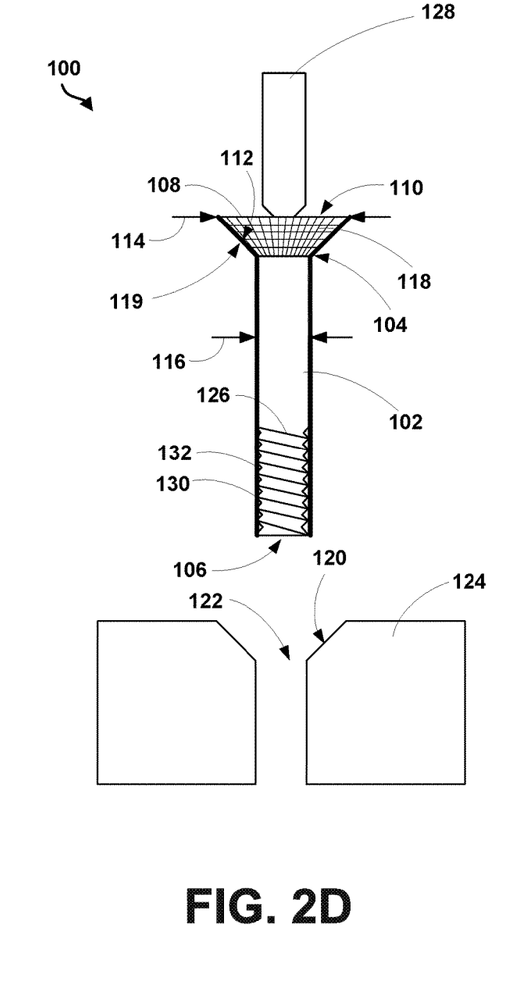
FIG. 2D is a side view of another example fastener, according to an example embodiment

As shown in FIGS. 2A-2D, the plurality of textured elements 118 can take a variety of forms. In particular, as shown in FIG. 2A, the plurality of textured elements 118 comprise a straight line pattern. In another example, as shown in FIG. 2B, the plurality of textured elements 118 comprise a diagonal line pattern. In another example, as shown in FIG. 2C, the plurality of textured elements 118 comprise a sinusoidal line pattern. In yet another example, as shown in FIG. 2D, the plurality of textured elements 118 comprise a waffle pattern. Other patterns for the plurality of textured elements 118 are possible as well.

As described above and as shown in FIGS. 2A-2D, one or more of the plurality of textured elements 118 extend from the exterior surface 119 of the sleeve 130 to the first surface 110 of the head 108. Such an arrangement provides a path to allow sealant to flow out from under the head 108 of the fastener 100. In one example, one or more of the plurality of textured elements 118 extend on the exterior surface of the sleeve from the first end 104 of the elongated body 102 to the first surface 110 of the head 108 of the fastener 100. Such an arrangement may help to increase the friction between the fastener 100 and a surface 120 in the hole 122 in a workpiece 124 to inhibit rotation of the fastener 100, as discussed in additional detail below.

In one example, as shown in FIGS. 2A-2C, each of the plurality of textured elements 118 are parallel to one another. Such an arrangement may provide a more uniform path for sealant to flow out from under the head 108 of the fastener 100 when installed in the hole 122 in the workpiece 124. In another example, as shown in FIG. 2D, one or more of the plurality of textured elements 118 intersect one another. Such an arrangement may provide increased friction between the fastener 100 and the surface 120 in the hole 122 to inhibit rotation of the fastener 100 during installation. In yet another example, the plurality of textured elements 118 form a non-repeating or random pattern. Other examples are possible as well.

As shown in FIGS. 2A-2D, in one embodiment at least a portion of the elongated body 102 includes a plurality of threads 126 defined by a plurality of crests and a plurality of roots. In one example, the plurality of threads 126 may help with installation of the fastener 100 when in use by securing the elongated body 102 in the hole 122 in the workpiece 124. Further, as shown in FIGS. 2A-2D, the second surface 112 of the head 108 of the fastener 100 may taper from the first surface 110 of the head 108 to the first end 104 of the elongated body 102. The sleeve 130 may include a similar taper in the area surrounding the head 108 of the fastener 100. Such an arrangement may provide a snug fit for the head 108 of the fastener 100 in the hole 122 in the workpiece 124 when the hole 122 is countersunk into the workpiece 124.

In one embodiment, the plurality of textured elements 118 comprise a plurality of grooves recessed in the exterior surface 119 of the sleeve 130. In such an example, a depth of each of the plurality of grooves ranges from about 0.0005 inches to about 0.02 inches. The plurality of grooves provide a plurality of paths for sealant to escape from under the second surface 112 of the head 108 of the fastener 100 when the fastener 100 is position in the hole 122 in the workpiece 124, thereby preventing hydraulic lock between the fastener 100 and the surface 120 of the hole 122. In addition, the plurality of grooves are configured to increase the friction between the fastener 100 and the surface 120 in the hole 122 to inhibit rotation of the fastener 100 during installation.

In another embodiment, the plurality of textured elements 118 comprise a plurality of protrusions extending outward from the exterior surface 119 of the sleeve 130. In such an example, a height of each of the plurality of protrusions ranges from about 0.0005 inches to about 0.02 inches. The space between the plurality of protrusions provide a plurality of paths for sealant to escape from under the head 108 of the fastener 100 when the fastener 100 is position in the hole 122 in the workpiece 124, thereby preventing hydraulic lock between the fastener 100 and the surface 120 of the hole 122. In addition, the plurality of protrusions are configured to increase the friction between the fastener 100 and the surface 120 in the hole 122 to inhibit rotation of the fastener 100 during installation.

The fastener 100 may further include a drive 128 formed in the first surface 110 of the head 108. In one example, as shown in FIGS. 2A-2D, the drive 128 comprises a frangible component configured to break off from the first surface 110 of the head 108 after the fastener 100 is torqued to a desired level. In another example, the drive 128 comprises a polygonal recess formed in the first surface 110 of the head 108 that is configured to receive a corresponding polygonal driver. In yet another example, the drive 128 comprises a plurality of radially extending slots recessed in the first surface 110 of the head 108 that is configured to receive corresponding radially extending protrusions of a driver. In each example described above, the drive 128 provides a surface onto which a corresponding driver is able to rotate the fastener 100 to thereby install the fastener 100 in the hole 122 in the workpiece 124.

As discussed above, the fastener 100 can take a variety of forms. In one embodiment, as shown in FIGS. 2A-2D, the fastener 100 comprises a one-sided fastener. In such an example, as discussed above, the fastener 100 includes a sleeve 130 positioned over at least a portion of the elongated body 102 and the second surface 112 of the head 108. The sleeve 130 may include a threaded locking feature 132 configured to interact with the plurality of threads 126 of the elongated body 102. In use, as the drive 128 is rotated, a portion of the sleeve 130 deforms and compresses against the backside of the workpiece 124 to thereby secure the fastener 100 to the workpiece 124. Once the fastener 100 is torqued to a desired level, the drive 128 is configured to break off from the first surface 110 of the head 108.

In another embodiment, the fastener 100 comprises a flush head fastener. In such an example, the plurality of textured elements 118 may be positioned directly on the second surface 112 of the head 108, and one or more of the plurality of textured elements 118 extend from the second surface 112 of the head 108 to the first surface 110 of the head 108. In yet another embodiment, the fastener 100 comprises a protruding head fastener. In such an example, the second surface 112 of the head 108 of the fastener 100 is parallel to the first surface 110 of the head 108 of the fastener 100. As with the flush head fastener embodiment, in the protruding head fastener example the plurality of textured elements 118 may be positioned directly on the second surface 112 of the head 108, and one or more of the plurality of textured elements 118 extend from the second surface 112 of the head 108 to the first surface 110 of the head 108. Other fastener types are possible as well.

FIG. 3 is a block diagram of an example of a method 200 of manufacturing a fastener. Method 200 shown in FIG. 3 presents an embodiment of a method that could be used to manufacture the fastener 100 described above in relation to FIGS. 1-2D, as an example. Method 200 includes one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 202, the method 200 includes forming an elongated body 102 having a first end 104 and a second end 106 opposite the first end 104. At block 204, the method 200 includes forming a head 108 having a first surface 110 and a second surface 112 opposite the first surface 110. The first end 104 of the elongated body 102 is coupled to the second surface 112 of the head 108. In one example, the elongated body 102 and the head 108 are formed integrally as a single unit. In another example, the elongated body 102 and the head 108 are formed separately and are coupled together during the manufacturing process. A diameter 114 of the head 108 is greater than a diameter 116 of the elongated body 102. At block 206, the method 200 includes forming a sleeve 130 positioned over at least a portion of the elongated body 102 and the second surface 112 of the head 108. At block 208, the method 200 includes forming a plurality of textured elements 118 on an exterior surface 119 of the sleeve 130 adjacent the second surface 112 of the head 108. As discussed above, one or more of the plurality of textured elements 118 extend from the exterior surface 119 of the sleeve 130 to the first surface 110 of the head 108.

In one example, forming the plurality of textured elements 118 on the second surface 112 of the head 108 comprises rolling the plurality of textured elements 118. In another example, forming the plurality of textured elements 118 on the second surface 112 of the head 108 comprises forging the plurality of textured elements 118. In yet another example, forming the plurality of textured elements 118 on the second surface 112 of the head 108 comprises laser engraving or texturing the plurality of textured elements 118. Other embodiments are possible as well.

In another example, the method 200 may include forming a plurality of textured elements 118 on the second surface 112 of the head 108 of the fastener 100. In such an example, one or more of the plurality of textured elements 118 extend from the second surface 112 of the head 108 to the first surface 110 of the head 108.

In certain embodiments, one or more steps of the method 200 described above in relation to FIG. 3 may be performed by an additive-manufacturing machine, such as stereolithography, multi-jet modeling, inkjet printing, selective laser sintering/melting, and fused filament fabrication, among other possibilities. In one example, the additive-manufacturing machine creates the fastener 100 described in any one of FIGS. 1-2B using a single material. Such a material includes stainless steel, titanium, nickel super-alloy, aluminum, polymer composites (e.g., carbon fiber reinforced nylon) and polymer nanocomposites (e.g., carbon nanotube filled nylon), polyether ether ketone (PEEK), polyethylene (PE), or polypropylene (PP), as examples. In another example, the additive-manufacturing process is a multi-material additive-manufacturing process such that various components of the fastener 100 are formed using a material with a material property than the other components. Other examples are possible as well.

Figure 4:
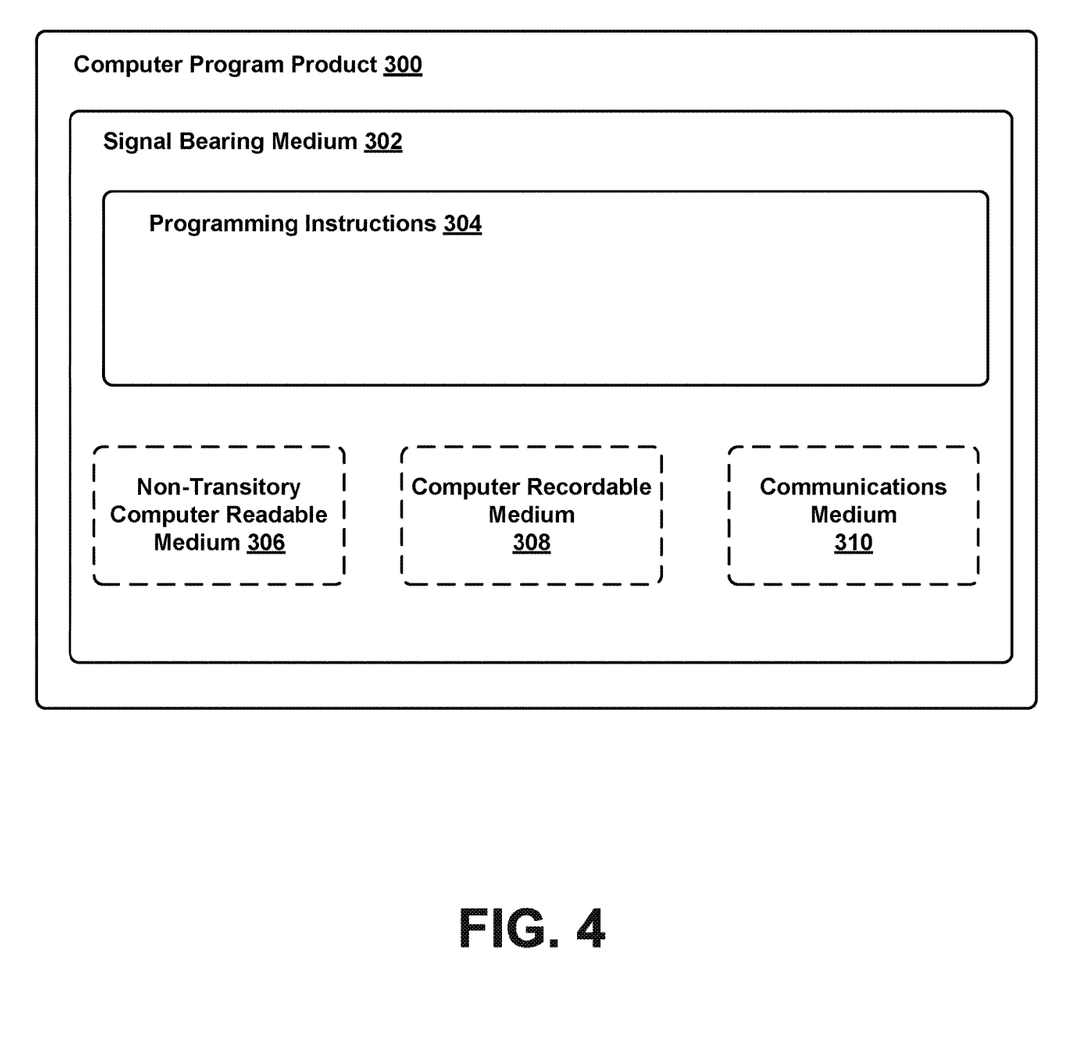
FIG. 4 is an example computer-readable medium configured according to an example implementation to cause a manufacturing machine to create one or more components of the fastener of FIGS. 1-2D.

Additionally or alternatively, the manufacturing processes described above may be controlled by non-transitory computer-readable medium. FIG. 4 depicts an example non-transitory computer-readable medium configured according to an example implementation. In example implementations, the system may include one or more processors, one or more forms of memory, one or more input devices/interfaces, one or more output devices/interfaces, and machine readable instructions that, when executed by the one or more processors, cause manufacturing machine to create one or more components of the fastener 100 of any of the examples described above with respect to FIGS. 1-2D.

In one implementation, the example computer program product 300 is provided using a signal bearing medium 302. The signal bearing medium 302 may include one or more programming instructions 304 that, when executed by one or more processors may cause manufacturing machine to create one or more components of the fastener 100 of any of the embodiments described above with respect to FIGS. 1-2D. In some examples, the signal bearing medium 302 may be a non-transitory computer-readable medium 306, such as, but not limited to, a hard disk drive, a Compact Disc (CD), a Digital Video Disk (DVD), a digital tape, memory, etc. In some implementations, the signal bearing medium 302 may be a computer recordable medium 308, such as, but not limited to, memory, read/write (R/W) CDs, R/W DVDs, etc. In some implementations, the signal bearing medium 302 may be a communications medium 310 (e.g., a fiber optic cable, a waveguide, a wired communications link, etc.). Thus, for example, the signal bearing medium 302 may be conveyed by a wireless form of the communications medium 310.

The one or more programming instructions 304 may be, for example, computer executable and/or logic implemented instructions. In some examples, a computing device may be configured to provide various operations, functions, or actions in response to the programming instructions 304 conveyed to the computing device by one or more of the non-transitory computer-readable medium 306, the computer recordable medium 308, and/or the communications medium 310.

The non-transitory computer-readable medium 306 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be a remotely located computer system, such as a server.

FIG. 5 is a block diagram of an example of a method 400 for positioning a fastener in a workpiece. Method 400 shown in FIG. 5 presents an embodiment of a method that could be carried out using the fastener 100 described above in relation to FIGS. 1-2D, as an example. Method 400 includes one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 402, the method 400 includes positioning a sealant on at least a portion of the fastener 100. The sealant may be positioned on the sleeve 130, or other exterior surface of the fastener 100. At block 404, the method 400 includes inserting a second end 106 of an elongated body 102 of a fastener 100 into the hole 122 in the workpiece 124. The fastener 100 may include any of the features of the fastener 100 described above in relation to FIGS. 1-2D. In particular, the fastener 100 includes a first end 104 opposite the second end 106, and a head 108 having a first surface 110 and a second surface 112 opposite the first surface 110. The first end 104 of the elongated body 102 is coupled to the second surface 112 of the head 108 of the fastener 100. The fastener 100 may also include a sleeve 130 positioned over at least a portion of the elongated body 102 and the second surface 112 of the head 108.

At block 406, the method 400 includes mating an exterior surface 119 of the sleeve 130 adjacent the second surface 112 of the head 108 to a surface 120 in the hole 122. As described above, the fastener 100 includes a plurality of textured elements 118 positioned on the exterior surface 119 of the sleeve 130 adjacent the second surface 112 of the head 108. In use, the plurality of textured elements 118 are configured to create friction between the fastener 100 and the surface 120 in the hole 122 to inhibit rotation of the fastener 100. Further, the plurality of textured elements 118 allow the sealant to flow out from under the head 108 of the fastener 100 by providing a plurality of flow paths for the sealant to thereby prevent hydraulic lock between the fastener 100 and the surface 120 of the hole 122.

In one embodiment, the method 400 further includes rotating the fastener 100 after inserting the second end 106 of the elongated body 102 of the fastener 100 into the hole 122 in the workpiece 124. In one particular example, rotating the fastener 100 comprises rotating a drive 128 formed in the first surface 110 of the head 108. As discussed above, the drive 128 may comprise a frangible component configured to break off from the first surface 110 of the head 108 after the fastener 100 is torqued to a desired level. In such an example, rotating the fastener 100 may cause the sleeve 130 to deform and compress against the backside of the workpiece 124 to thereby secure the fastener 100 to the workpiece In another example, the drive 128 comprises a polygonal recess formed in the first surface 110 of the head 108 that is configured to receive a corresponding polygonal driver. In yet another example, the drive 128 comprises a plurality of radially extending slots recessed in the first surface 110 of the head 108 that is configured to receive corresponding radially extending protrusions of a driver.

In another example, as discussed above, the plurality of textured elements 118 may be positioned directly on the second surface 112 of the head 108. In such an example, one or more of the plurality of textured elements 118 extend from the second surface 112 of the head 108 to the first surface 110 of the head 108. Further, in such an example, the method 400 includes mating the second surface 112 of the head 108 of the fastener 100 to the surface 123 in the hole 122.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A fastener comprising:
    an elongated body having a first end and a second end opposite the first end;
    a head having a first surface and a second surface opposite the first surface, wherein the first end of the elongated body is coupled to the second surface of the head, and wherein a diameter of the head is greater than a diameter of the elongated body;
    a sleeve positioned over the elongated body extending from the second end of the elongated body to the first end of the elongated body and extending from the first end of the elongated body over the second surface of the head and up to the first surface of the head; and
    a plurality of textured elements positioned on an exterior surface of the sleeve only along a portion of the sleeve adjacent the second surface of the head, wherein the plurality of textured elements comprise a plurality of grooves recessed in the exterior surface of the sleeve, wherein a depth of each of the plurality of grooves ranges from about 0.0005 inches to about 0.02 inches.

2. The fastener of claim 1, wherein the plurality of textured elements comprise a straight line pattern.

3. The fastener of claim 1, wherein the plurality of textured elements comprise a diagonal line pattern.

4. The fastener of claim 1, wherein the plurality of textured elements comprise a sinusoidal line pattern.

5. The fastener of claim 1, wherein the plurality of textured elements comprise a waffle pattern.

6. The fastener of claim 1, wherein each of the plurality of textured elements are parallel to one another.

7. The fastener of claim 1, wherein at least a portion of the elongated body includes a plurality of threads defined by a plurality of crests and a plurality of roots.

8. The fastener of claim 1, wherein the second surface of the head tapers from the first surface of the head to the first end of the elongated body.

9. The fastener of claim 1, wherein the fastener comprises a one-sided fastener.

10. The fastener of claim 1, wherein the sleeve includes a threaded locking feature to interact with the plurality of threads of the elongated body.

11. A method of manufacturing a fastener, the method comprising:
    forming an elongated body having a first end and a second end opposite the first end;
    forming a head having a first surface and a second surface opposite the first surface, wherein the first end of the elongated body is coupled to the second surface of the head, and wherein a diameter of the head is greater than a diameter of the elongated body;
    forming a sleeve positioned over the elongated body extending from the second end of the elongated body to the first end of the elongated body and extending from the first end of the elongated body over and the second surface of the head and up to the first surface of the head; and
    forming a plurality of textured elements positioned on an exterior surface of the sleeve only along a portion of the sleeve adjacent the second surface of the head, wherein the plurality of textured elements comprise a plurality of grooves recessed in the exterior surface of the sleeve, wherein a depth of each of the plurality of grooves ranges from about 0.0005 inches to about 0.02 inches.

12. The method of claim 11, wherein forming the plurality of textured elements on the exterior surface of the sleeve adjacent the second surface of the head comprises rolling the plurality of textured elements.

13. The method of claim 11, wherein forming the plurality of textured elements on the exterior surface of the sleeve adjacent the second surface of the head comprises forging the plurality of textured elements.

14. The method of claim 11, wherein forming the plurality of textured elements on the exterior surface of the sleeve adjacent the second surface of the head comprises laser engraving or texturing the plurality of textured elements.

15. The method of claim 11, wherein at least a portion of the elongated body includes a plurality of threads defined by a plurality of crests and a plurality of roots.

16. The method of claim 11, wherein the second surface of the head tapers from the first surface of the head to the first end of the elongated body.

17. The method of claim 11, wherein the plurality of textured elements comprise a straight line pattern.

18. The method of claim 11, wherein the plurality of textured elements comprise a diagonal line pattern.

19. A method for positioning the fastener of claim 1 in a workpiece, the method comprising:
positioning a sealant on at least a portion of the fastener;
inserting the second end of the elongated body of the fastener into a hole in the workpiece; and
mating an exterior surface of the sleeve adjacent the second surface of the head to a surface in the hole, wherein the plurality of textured elements positioned on the exterior surface of the sleeve are configured to create friction between the fastener and the surface in the hole to inhibit rotation of the fastener and to further allow the sealant to flow out from under the head of the fastener.

20. The method of claim 19, further comprising:
rotating the fastener after inserting the second end of the elongated body of the fastener into the hole in the workpiece.

* * * * *